(12) United States Patent
Yu et al.

(10) Patent No.: US 6,446,427 B1
(45) Date of Patent: Sep. 10, 2002

(54) SOLID FUEL REGRESSION RATE CONTROL METHOD AND DEVICE

(75) Inventors: Kenneth Yu, Gaithersburgh, MD (US); Klaus C. Schadow, Ridgecrest, CA (US); Kenneth Wilson, Ridgecrest, CA (US); Timothy Parr, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/618,412

(22) Filed: Jul. 18, 2000

(51) Int. Cl.[7] ................................................. C06D 5/00
(52) U.S. Cl. ........................................... 60/219; 60/769
(58) Field of Search ........................ 60/204, 219, 270.1

(56) References Cited

U.S. PATENT DOCUMENTS

| 3,844,118 A | 10/1974 | Wilkinson |
| 4,628,688 A | 12/1986 | Keirsey |
| 4,745,740 A | * 5/1988 | Dunn et al. .................... 60/234 |
| 4,760,695 A | 8/1988 | Brown et al. |
| H1007 H | * 1/1992 | Schadow et al. ........... 431/350 |
| 5,494,438 A | * 2/1996 | Yang ........................... 431/350 |
| 5,520,459 A | 5/1996 | Yu et al. |

* cited by examiner

Primary Examiner—Charles G. Freay
(74) Attorney, Agent, or Firm—Anthony J. Serventi

(57) ABSTRACT

The present invention relates to a method and device for controlling the solid fuel regression rate of a solid fuel ramjet engine. In a preferred embodiment of the present invention, pressure oscillations are excited using active, closed-loop control to vary the heat transfer, and in turn the regression rate of a solid fuel ramjet engine. The pressure oscillations are excited by introducing small disturbances into the shear layer. The disturbances are amplified in the shear layer and excite pressure oscillations. The disturbances are introduced at a certain phase relative to the pressure oscillations. This is accomplished by closed-loop control. By varying the phase, the amplitude of the pressure oscillations can also be varied, which in turn will vary the heat transfer, regression rate, and thrust level.

12 Claims, 5 Drawing Sheets

SOLID FUEL REGRESSION RATE CONTROL METHOD AND DEVICE

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

MICROFICHE APPENDIX

Not Applicable.

BACKGROUND OF THE INVENTION

1. Field of the Invention

This invention relates to solid fuel ramjet engines and more particularly to a device for controlling/varying thrust. In more particularity the invention relates to a device for varying the heat transfer to the solid fuel by exciting pressure oscillations at a controlled amplitude in the combustor and consequently controlling the fuel regression rate and thrust level.

2. Description of the Related Art

Solid fuel ramjet engines, whether brought to operational speed by a booster engine or air dropped from a vehicle, depend upon the introduction of air into the engine due to its forward motion. Thus the term ramjet is used. As the ram air passes through a solid fuel grain within a combustor, fuel rich gases generated by the solid fuel react with oxygen in the air inside the solid fuel bore and in the further downstream located mixing chamber of the combustor and pass out of the engine via a nozzle producing thrust.

The rate at which the fuel rich gases are generated from the solid fuel grain, in general, depends on the fuel grain surface area, temperature and pressure within the combustor and the mass rate of air flow over the fuel grain. Due to a wide range of flight conditions encountered by the engine during operation, the air mass flow varies considerably while the missile is changing speed and altitude. Without some means of controlling the burn rate of the solid fuel in response to changes in air mass flow excessively rich combustion chamber conditions will exist, which is very wasteful of fuel and reduces the range of the vehicle. Additionally, engine variables, such as changes in the solid fuel grain area, thrust, and combustor temperatures and pressures, as well as missile flight parameters, such as Mach number and angle of attack necessitate changes in fuel burn rate to maintain the variable within acceptable limits.

In addition, solid fuel ramjets for tactical missile propulsion require thrust throttling capability to avoid overspeeding. Ramjets, in their standard design, have no means for on-demand thrust throttling. This results in overspeeding, because higher speeds increase the air flow velocity over the fuel grain, which results in an increase in the regression rate. The result is a continual increase in thrust, which adversely affects the control and maneuverability of the missile system and limits the range. Currently, the problem of thrust throttling is addressed by varying the air mass flow through the fuel grain using mechanical devices with moving parts.

Heretofore, efforts have been directed to engine configurations that either bypass a portion of the ram air around the solid fuel combustor or vent a portion of the air outside of the vehicle. In both cases the object is to reduce the air flow into the solid fuel combustor and reduce the burn rate of the fuel.

Another common technique used to control the uniformity, but not directly the rate of fuel burning, includes a tube-in-hole arrangement, whereby a tube is inserted into the fuel grain inlet. The tube splits the air flow and improves the uniformity of burning of the solid fuel grain.

A device for controlling the rate of fuel burning, in the combustor, but not necessarily the uniformity thereof, is disclosed in U.S. Pat. No. 3,844,118 issued to Wilkinson on Aug. 28, 1973, wherein a valve moves to restrict the air inlet to the fuel grain in response to engine conditions, rather than ambient air conditions, to vary the total mass flow of air into the solid fuel combustor. Also, the '118 patent discloses a device, which employs mechanical moving parts.

The tube-in-hole technique has proven effective in improving the distribution of air within the solid fuel combustor and uniformity of the fuel burn; however, these devices do not provide for continuously changing the distribution of air within the combustor in response to instantaneous changes in mass air flow or engine and missile parameters encountered in flight. Rather, the tube-in-hole is designed to give more uniform burning for a nominal flight condition, and over rich fuel conditions still present a problem. The tube-in-hole technique is described U.S. Pat. No. 4,628,688 issued to Keirsey on Dec. 16, 1986. U.S. Pat. No. 4,628,688 is incorporated by reference herein.

The valve arrangement set out, and other devices for throttling the air into the combustor, while effective in changing the total air flow through the combustor in a predetermined manner, and, thereby achieving a change in fuel burn rate, do not achieve the change in fuel burn rate by controlling the distribution of air over the fuel grain surface in response to instantaneous changes in air mass flow encountered. Rather, the valve arrangement responds only to engine variables, such as increasing fuel grain area or thrust, to throttle the air flow into the combustor, causing fuel production to increase or decrease, thereby achieving the desired result.

U.S. Pat. No. 4,628,688 discloses a solid fuel ramjet engine having means for increasing or decreasing the generation of fuel rich combustion gases as a function of changes in air mass flow rate into the solid fuel combustor, engine variables or missile flight conditions over its flight path. The fuel flow device includes a translating tube inserted into the air inlet of the fuel combustor for splitting the air flow into two portions, one directed along the fuel grain and the other directed through the center of the grain. A servomechanism continuously moves the tube longitudinally into and out of the fuel grain in response to instantaneous changes in the specific parameter being sensed, such as air mass flow as sensed by a sensor mounted in the air inlet. The position of the tube changes the airflow distribution and aerodynamic shear interaction of the air flow over the fuel grain surface which causes a change in the rate of fuel regression as a function of the instantaneous condition sensed.

The present invention is related to utilizing flow vortices for controlling heat transfer. The periodic shedding of vortices produced in highly sheared gas flows has been recognized as a source of substantial acoustic energy for many years. For example, experimental studies have demonstrated that vortex shedding from gas flow restrictors disposed in large, segmented, solid propellant rocket motors couples with the combustion chamber acoustics to generate substantial acoustic pressures. The maximum acoustic energies are produced when the vortex shedding frequency matches one of the acoustic resonances of the combustor. It has been demonstrated that locating the restrictors near a velocity antinode generated the maximum acoustic pressures in a solid propellant rocket motor, with a highly sheared flow occurring at the grain transition boundary in boost/sustain type tactical solid propellant rocket motors.

An apparatus and method for controlling pressure oscillations caused by vortex shedding is disclosed is in U.S. Pat. No. 4,760,695 issued to Brown, et al. on Aug. 2, 1988. The '695 patent discloses an apparatus and method for controlling pressure oscillations caused by vortex shedding. Vortex shedding can lead to excessive thrust oscillations and motor vibrations, having a detrimental effect on performance. This is achieved by restricting the grain transition boundary or combustor inlet at the sudden expansion geometry, such that the gas flow separates upstream and produces a vena contract a downstream of the restriction, which combine to preclude the formation of acoustic pressure instabilities in the flowing gas stream. Such an inlet restriction also inhibits the feedback of acoustic pressure to the point of upstream gas flow separation, thereby preventing the formation of organized oscillations. The '695 patent does not present a method or apparatus, which attempts to control pressure oscillations for the purpose of manipulating the thrust throttling capability of a ramjet engine.

SUMMARY OF THE INVENTION

The invention is related to solid fuel ramjet engines in missile systems, which do not possess thrust throttling capability, in their standard design. The lack of thrust throttling capability results in overspeeding. At higher speeds, the increasing air flow velocity over the fuel grain increases the regression rate of the fuel grain. As a result, the velocity is continually increased, which adversely affects the control and maneuverability and reduces the achievable range of the missile system. The present invention provides a device for controlling the regression rate in a solid fuel ramjet by exciting pressure oscillations in the combustor, rather than varying the air flow through the fuel tube. For example, to avoid overspeeding, pressure oscillations at controlled amplitude are exeited in the boost phase to achieve high thrust and the pressure oscillations are turned off during the cruise phase to achieve long range.

The regression rate in a solid fuel ramjet depends on the heat transfer from the boundary combustion zone into the solid fuel grain. To vary the heat transfer, and in turn the regression rate, pressure oscillations are excited using active, closed-loop control. The pressure oscillations are excited by introducing small disturbances into the shear layer. The disturbances are amplified in the shear layer and excite pressure oscillations. The disturbances are introduced at a certain phase relative to the pressure oscillations. This is accomplished by closed-loop control. By varying the phase, the amplitude of the pressure oscillations can also be varied, which in turn will vary the heat transfer, regression rate, and thrust level.

In a preferred embodiment of the present invention an actuator introduces small disturbances into the initial shear layer of the combustor of a solid fuel ramjet engine. The small disturbances are amplified in the shear layer and excite pressure oscillations. A sensor monitors the pressure oscillations and a controller determines the correct phase between the pressure oscillations and the actuator action.

One object of the present invention is to provide a method and apparatus for controlling the solid fuel regression rate of a solid fuel ramjet engine by varying the heat transfer from the combustion zone to the solid fuel grain using pressure oscillations.

Another object of the invention is to provide a method for on demand thrust throttling without the use of a device with mechanical moving parts.

Another object of the invention is to provide a method for on demand thrust throttling of a solid fuel ramjet engine by manipulation of the heat transfer across the solid fuel grain.

Another object of the invention is to provide a method for varying the heat transfer across the solid fuel grain of a solid fuel ramjet engine by varying the amplitude and frequency pressure oscillations in the combustor.

Another object of the invention is to provide an apparatus for varying the heat transfer across the solid fuel grain of a solid fuel ramjet engine by producing pressure oscillations.

A still further object of the invention is to provide a method for a more fuel efficient solid fuel ramjet engine.

A still further object of the present invention is to provide a ramjet engine, which can avoid overspeeding at high speeds, i.e. above Mach 4.

BRIEF DESCRIPTION OF THE DRAWINGS

Other objects, advantages, and novel features of the present invention will be apparent from the following detailed description when considered with the accompanying drawings wherein.

DETAILED DESCRIPTION OF THE INVENTION

Figure 1:
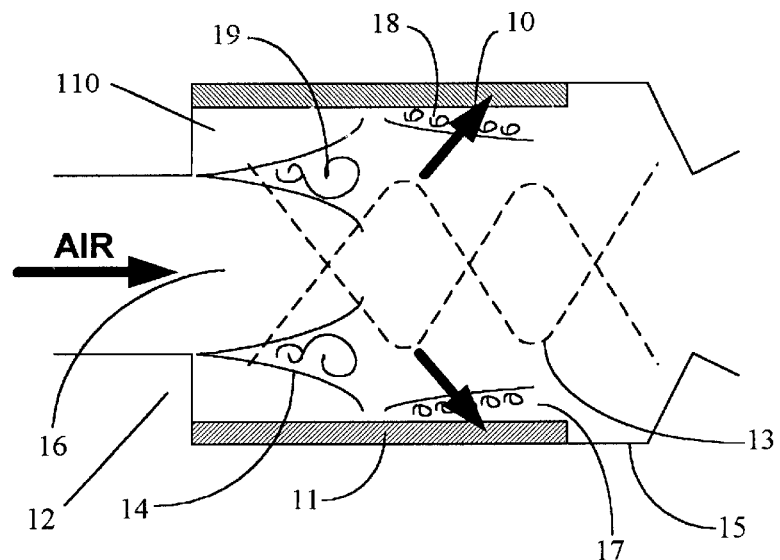
FIG. 1 is a pictorial representation of a preferred embodiment of the present invention in which the interaction of large shear-flow structures with combustion excite pressure oscillations, which create smaller scale vortices in the boundary layer above the solid fuel grain surface, causing a variation in the heat transfer to the solid fuel grain surface.
Figure 2:
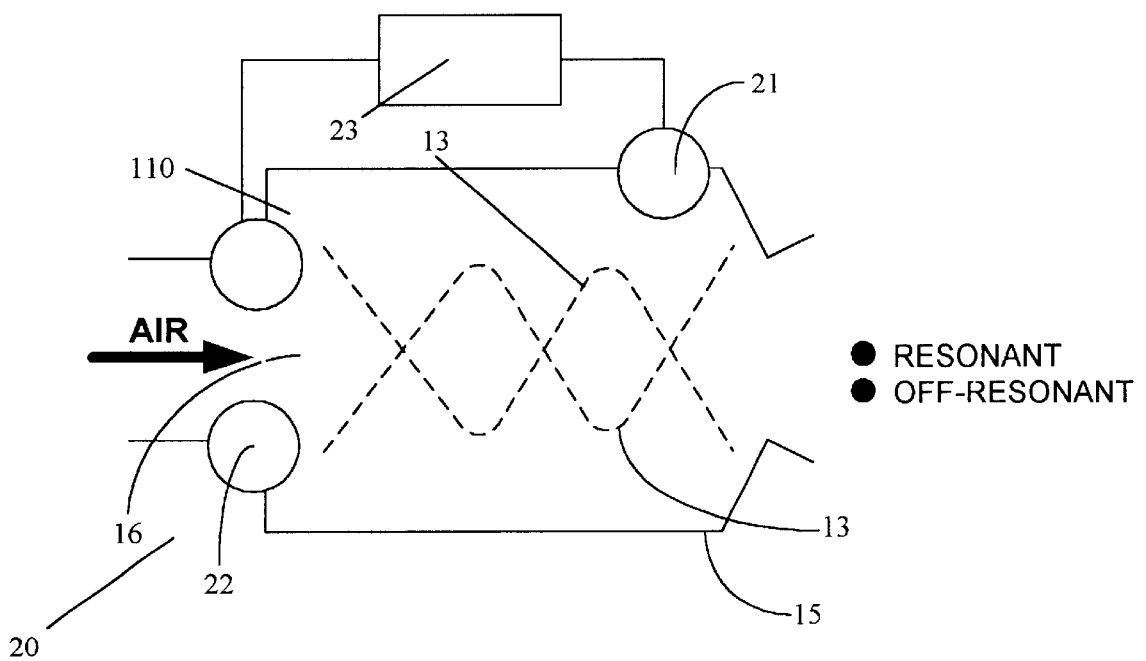
FIG. 2 is a pictorial representation of a preferred embodiment of the present invention in which pressure oscillations are created by an actuator, monitored by a sensor and manipulated by a controller.

FIG. 1 shows a regression rate control method in accordance with a preferred embodiment of the present invention for enhancement of the heat transfer 10 to the solid fuel grain 11 of a solid fuel ramjet engine 12 by self-excited pressure oscillations 13, in contrast to actively controlled pressure oscillation, as illustrated in FIG. 2.

Pressure oscillations may have any mode or modes corresponding to the configuration of cavity and to the acoustic velocity therein. Pressure oscillations, which are propagated in a direction generally along the flow of air, are termed longitudinal oscillations, and pressure oscillations, which are propagated in a direction generally normal to the flow of air, are termed transverse oscillations. In a preferred embodiment of the present invention the oscillations reinforce each other. Such oscillations with initially small amplitude are forcing the shear layer 14 of the combustor 15 at an opening thereof 16, which is juxtapositioned to the flow of air and disposed toward where the shear layer 14 develops. Through interaction with the combustion process the large-scale vortices 19 excite pressure oscillations, which further enhance the coherence of vortical structures 19 in the shear layer 14 and subsequently the amplitude of the oscillations. Such vortical structures 19 widen the shear layer 14 and enhance the heat transfer to the solid fuel grain 11. In addition, the pressure oscillations are forcing the boundary layer 17 above the solid fuel surface 11 and are generating smaller scale vortices 18, which are also enhancing the heat transfer 10. The present invention can provide vortical structures 19 even when the shear layer 14 is compressible due to its high speed, including supersonic speed, or due to its being heated from combustion.

In the case of naturally excited oscillations, as illustrated in FIG. 1, no active device is necessary to drive the oscillations and the present invention functions passively and yet may provide substantial acoustic energy for forcing the vortical structures 19 and 18 in the shear layer 14 and boundary layer 17. This energy is fed back into the flow; and, as will be subsequently apparent, no element utilized with various embodiments of the present invention projects into the flow of air so as to generate undesired turbulence therein. The present invention thus provides high amplitude oscillations to force and enhance such vortical structures without the flow of air being undesirably deflected or having its energy substantially reduced. However without active forcing, illustrated in FIG. 2, the generation of oscillations and its amplitude and frequency cannot be controlled in a desired manner, which makes active forcing desirable for many applications.

FIG. 2 shows an apparatus 20 which incorporates a preferred embodiment of the present invention. The pressure oscillations are excited by active, closed loop control using a sensor 21, an actuator 22 and a controller 23. For closed-loop control, the pressure transducer signal is phase shifted by the controller 23 and is driving the actuator 22 for the disturbances. The sensor 21 monitors the pressure oscillations within the combustor 15. The actuator 22 introduces small disturbances into the initial shear layer 14. The disturbances are amplified in the shear layer 14 and excite pressure oscillations. The disturbances are introduced at a certain phase relative to the pressure oscillations. The small disturbances may be introduced by using acoustics, periodic heat releases or periodic flow disturbances. Examples of devices that may be employed to introduce the disturbances acoustically are active drivers and passive cavities. Examples of periodic flow disturbances are pulsed jets, fluidics or flaps. The pressure oscillations may be excited at resonant or off-resonant chamber acoustics. The controller 23 determines the correct phase between the pressure oscillations and the actuator 22 action.

The large-scale structures in the shear layer 14 mix hot reaction products from the recirculation zone 110 with the inlet air to provide flameholding, as illustrated in FIG. 1. Temperature in the combustor 15 is directly proportional to the vaporization of the solid fuel and the recirculization of hot gases keeps the flame on the solid fuel ignited. The solid fuel regression rate is controlled by the heat transfer from the combustion zone to the solid fuel grain. The heat transfer, and in turn the fuel regression rate and thrust, can be varied by the pressure oscillations in the combustor. Only with active control can the amplitude and frequency of the pressure oscillations be manipulated to vary the heat transfer.

Figure 5:
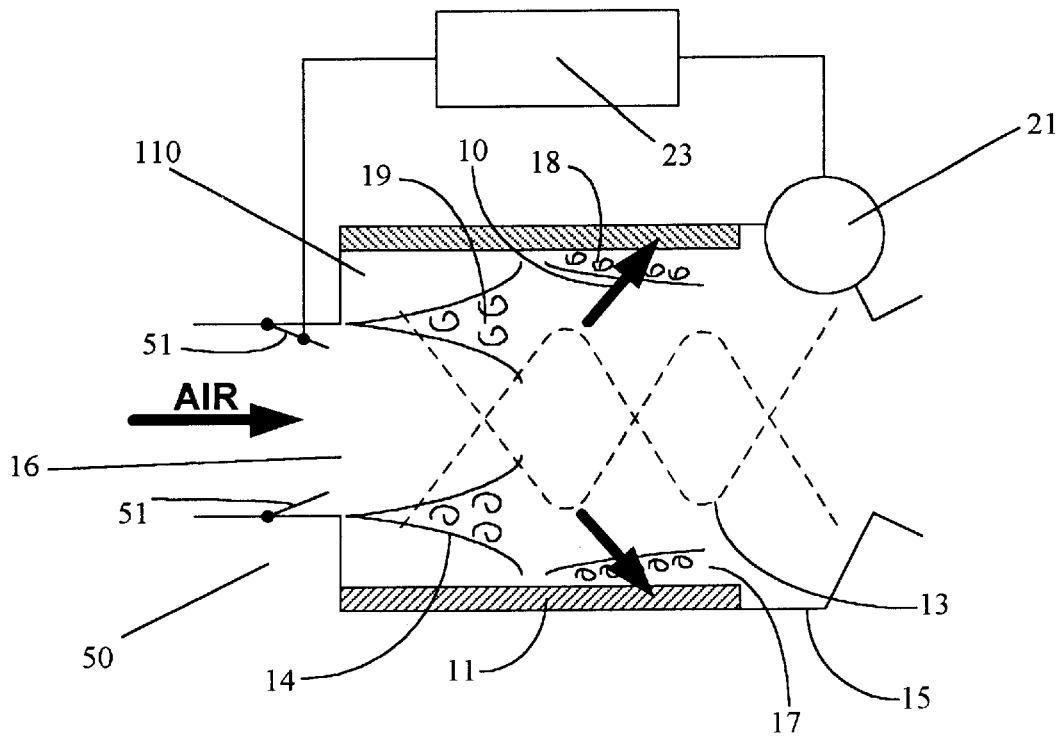
FIG. 5 is a pictorial representation of an embodiment of the present invention in which pressure oscillations are created by a mechanical actuator.
Figure 6:
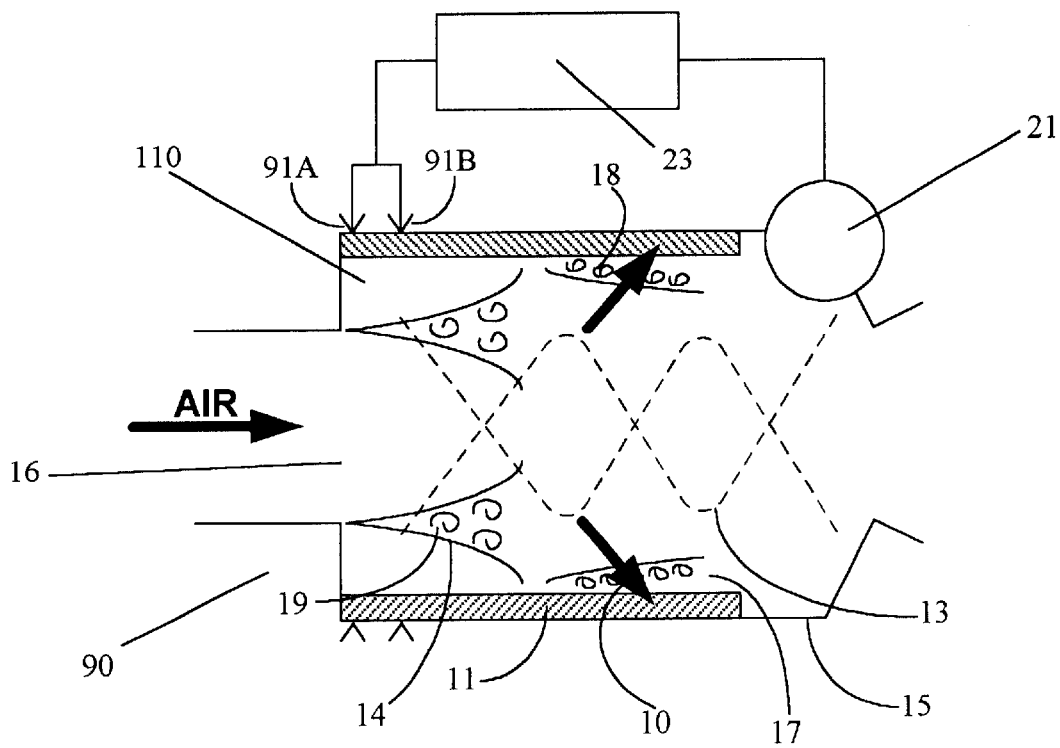
FIG. 6 is a pictorial representation of an embodiment of the present invention in which pressure oscillations are created by acoustic drivers.
Figure 7:
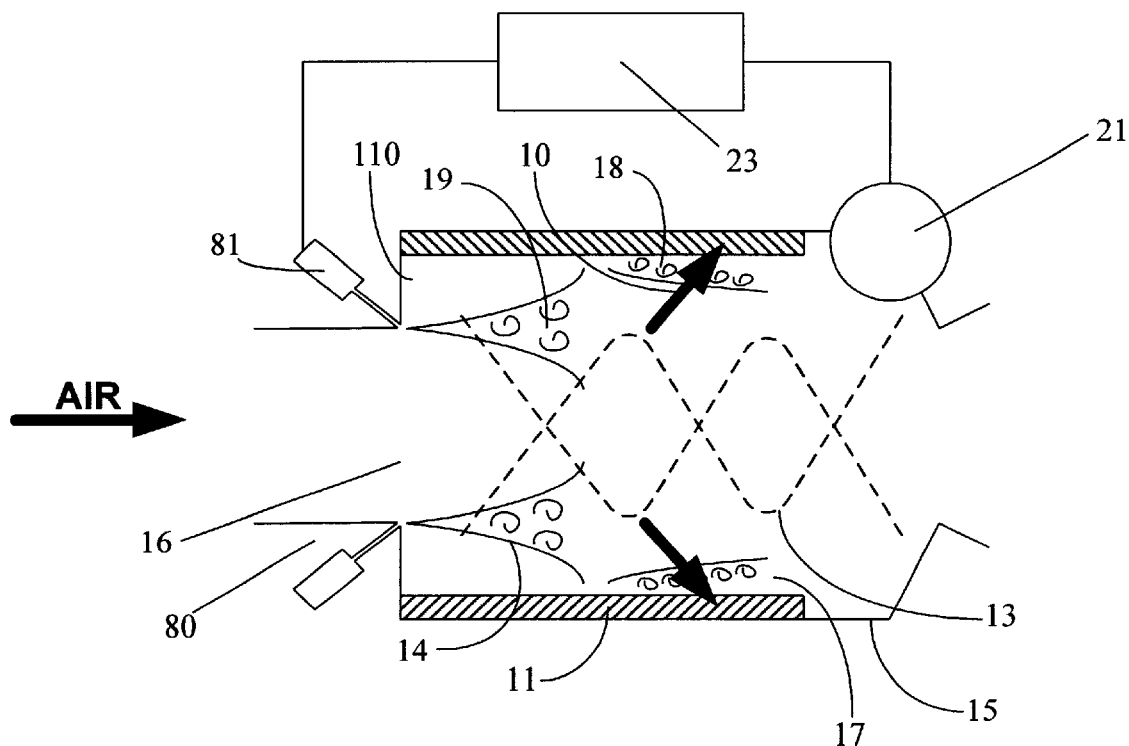
FIG. 7 is a pictorial representation of an embodiment of the present invention in which pressure oscillations are created by pulsed jets.

FIGS. 5, 6, and 7 illustrate examples of the various actuators that may be incorporated into the various embodiments of the invention. The actuators detailed in FIGS. 5–7 are well known in the art. Added FIG. 5 illustrates a mechanical actuator, specifically a flap 51, to introduce a disturbance into the shear layer 14. The controller 23 sets the angle of the flap 51, which determines the frequency of the pressure oscillations. Added FIG. 7 illustrates the use of pulsed jets 81 to introduce a disturbance into the shear layer 14. The controller 23 determines the rate and intensity of the pulsed jets 81 insertion of air. Added FIG. 6 illustrates the use of acoustic drivers 91A an 91B modify the pressure oscillation within the combustor 15.

Figure 3:
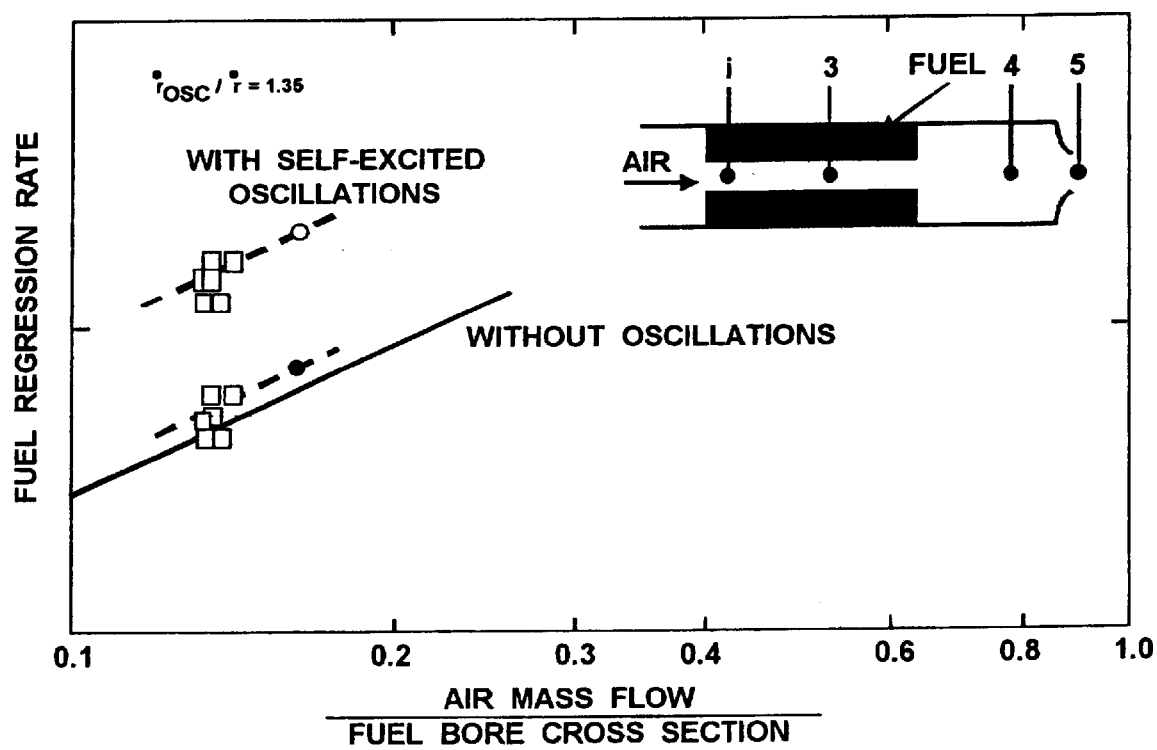
FIG. 3 is a graph showing the regression rate in a solid fuel ramjet changes with excited pressure oscillations.
Figure 4:
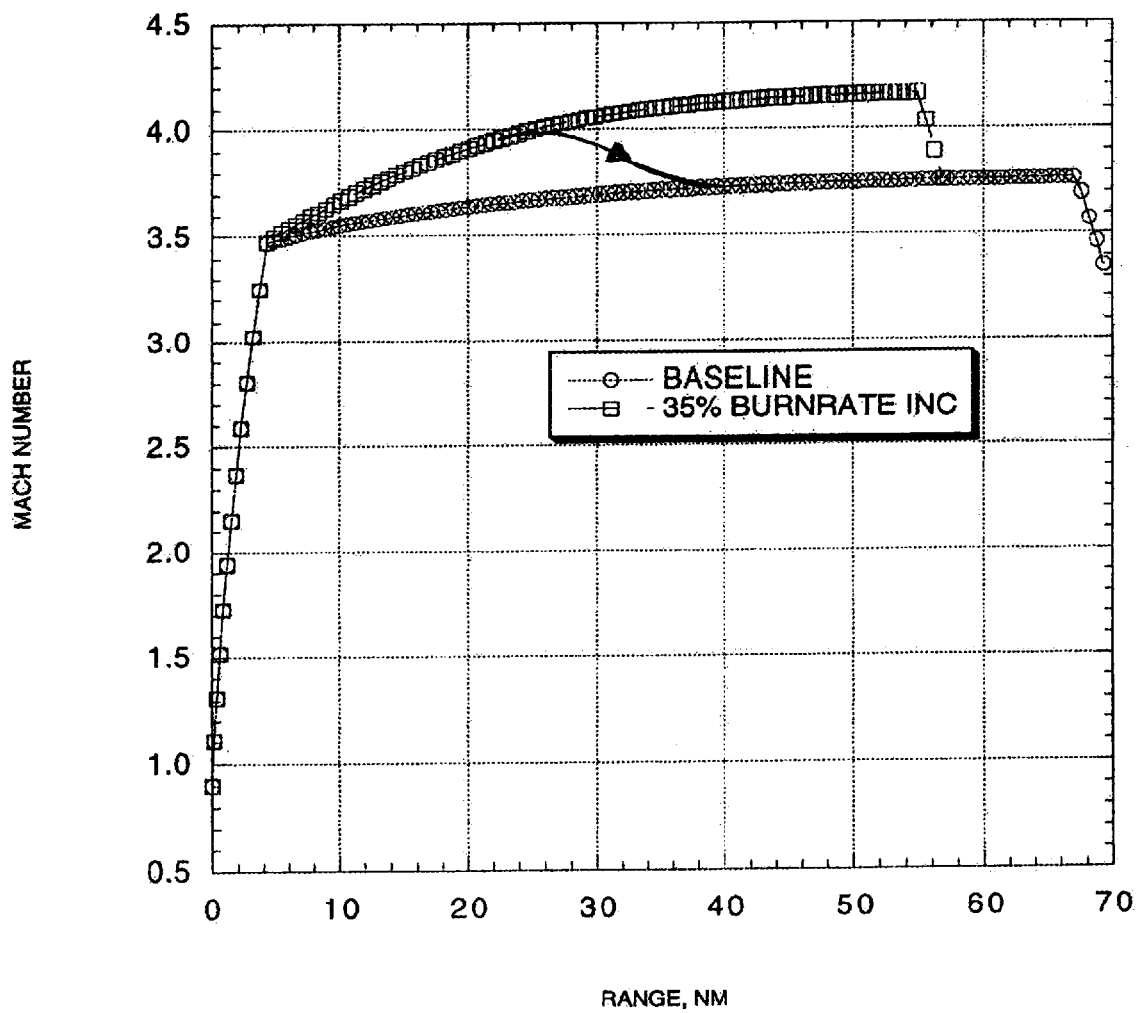
FIG. 4 is a graph showing that in a missile boosted to Mach 3.5, overspeeding above Mach 4 can be avoided.

Referring to FIG. 3, it is shown that the regression rate in solid fuel ramjets is 35% higher with self-excited pressure oscillations than during operation without oscillations. Referring to FIG. 4, it is shown that in a missile boosted to Mach 3.5, overspeeding to Mach 4 can be avoided, when the solid fuel regression rate enhancing pressure oscillations are turned off at Mach 4 and the regression rate is returned to baseline conditions.

Although the description above contains many specificities, these should not be construed as limiting the scope of the invention but as merely providing an illustration of the presently preferred embodiment of the invention. Thus the scope of this invention should be determined by the appended claims and their legal equivalents.

What is claimed is:

1. A method of controlling a solid fuel regression rate of a ramjet engine having a combustor with a shear layer, comprising:

introducing disturbances into said shear layer, said disturbances exciting pressure oscillations having an amplitude and a frequency, said pressure oscillations varying heat transfer across the solid fuel, wherein said varying of the heat transfer causes said regression rate of the solid fuel to change;

monitoring said pressure oscillations; and controlling the phase between said pressure oscillations and said disturbances.

2. The method of claim 1, further comprising:

manipulating the amplitude and the frequency of said pressure oscillations, wherein said manipulating varies the heat transfer across said solid fuel.

3. The method of claim 1 wherein said disturbances are introduced using acoustics, periodic flow disturbances or any combination thereof.

4. The method of claim 1 wherein said pressure oscillations may be excited at resonant or off-resonant chamber acoustics.

5. The device of claim 3, wherein said acoustics are active drivers.

6. The device of claim 3, wherein said periodic flow disturbances are pulsed jets or flaps.

7. A device, having a combustion chamber with a shear layer, for controlling the solid fuel regression rate in a ramjet engine comprising:

means for introducing disturbances into said shear layer, so that said disturbances excite pressure oscillations having an amplitude and a frequency;

means for monitoring said pressure oscillations; and means for controlling a phase between said pressure oscillations and said disturbances.

8. The device of claim 7, wherein said means for introducing disturbances is an actuator.

9. The device of claim 7, wherein said means for introducing disturbances comprises acoustics, periodic flow disturbances or any combination thereof.

10. The device of claim 9, wherein said periodic flow disturbances are pulsed jets or flaps.

11. A device having a combustion chamber with a shear layer, for controlling the solid fuel regression rate in a ramjet engine comprising:

an actuator, wherein said actuator introduces disturbances into the shear layer;

a sensor, wherein said sensor monitors pressure oscillations, having a phase, produced by the disturbances; and a controller, wherein said controller controls said phase between said pressure oscillations and the disturbances.

12. The device of claim 11, wherein said actuator is acoustic drivers, pulsed jets or flaps.

* * * * *